May 28, 1968 S. G. JOHNSTON 3,386,088

DISPLAY DEVICE

Filed Dec. 1, 1964

4 Sheets-Sheet 1

INVENTOR:
Spencer G. Johnston

By [signature] Attorney

John B. Miller, Jr.
Agent

May 28, 1968 S. G. JOHNSTON 3,386,088

DISPLAY DEVICE

Filed Dec. 1, 1964 4 Sheets-Sheet 2

INVENTOR:
Spencer G. Johnston
By [signature]
Attorney
John B. Miller, Jr.
Agent

May 28, 1968 S. G. JOHNSTON 3,386,088

DISPLAY DEVICE

Filed Dec. 1, 1964 4 Sheets-Sheet 3

INVENTOR:
Spencer G. Johnston
By John B. Miller Jr.
Attorney
Agent

DISPLAY DEVICE

Filed Dec. 1, 1964

INVENTOR:
Spencer G. Johnston
By John B. Miller, Jr.
Attorney
Agent

United States Patent Office 3,386,088
Patented May 28, 1968

3,386,088
DISPLAY DEVICE
Spencer G. Johnston, Los Angeles, Calif., assignor to Litton Systems, Inc., Beverly Hills, Calif.
Filed Dec. 1, 1964, Ser. No. 415,091
7 Claims. (Cl. 340—324)

ABSTRACT OF THE DISCLOSURE

A display device having a plurality of continuous display tapes, each containing display symbols and a machine code corresponding to each display symbol and a clock bit for indicating the centering of a display symbol in a viewing position; decoding means non-contiguously sense the code to generate a clock signal when a symbol is centered and a plurality of identification signals to indicate which symbol is displayed; logic means respond to said clock signal, said identification signals, and electrical signals stored in a machine register for producing a select command signal which energizes a motor to drive a shaft common to all tapes while releasing a hold solenoid which allows one tape drive sprocket at a time to turn with the shaft and rotate its associated display tape until a parity condition exists.

Many types of display devices are currently used by the designer to display information characteristic of computer or other electrical machine operation. Such devices range from purely mechanical counters to purely electrical display units. Each of these prior art devices, however, has its characteristic disadvantages; and most of such devices are quite large and heavy.

The mechanical display devices, for example, suffer from reliability problems due to severe wear on the numerous and duplicated mechanical parts (such as gears, pawls, dogs, pins and ratchets) during continuous and fast readout operation such as may be encountered in displaying computer information. Purely electronic display devices, on the other hand, normally utilize a switching matrix for choosing one particular display symbol within the device and then illuminating that one symbol while the others are kept dark. Symbols so displayed are recognizable, though not readily so. Recognizability is often improved by adding one or more illuminating tubes and increasing the complexity of the switching matrix. Nevertheless, the readability of the symbols in high ambient light conditions still remains difficult, and larger volumes of space must be provided for the duplicated drive circuitry. Additionally, when a loss of power occurs in such purely electronic display devices, the information stored in the drive circuitry and the last-displayed character in the display device are lost.

Recognizing these and other problems encountered in the above-mentioned display devices, a number of prior art devices have been proposed for providing an electromechanical translation of information (stored within a machine) to display symbols. In one such prior art device, display symbols are printed on a continuous tape. The display symbols on the tape are related to electrical location code patteerns positioned on an associated code disc that is gear coupled to the tape drive shaft. The tape is driven by a motor until the desired symbol is in position behind a view window, which condition is indicated by the symbol's corresponding location code being read from the code disc. Those skilled in the art have realized, however, that this gear arrangement of relating the symbols on the tape to location codes on a code disc and the concomitant code disc contact problems have created more serious difficulties in reliably using such a display device with a high speed machine.

It is, therefore, an object of the present invention to facilitate the exhibition of information contained in coded electrical signals as meaningful characters.

A further object of the present invention is to provide a highly efficient, non-contact electrical-to-visual converter that displays symbols representative of information contained in coded signals of a machine with which the converter is associated.

Yet another object of the present invention is to provide an alphanumeric display device that may be employed in a high ambient light environment.

It is yet another object of the present invention to increase the reliability of operation of in-line display devices by reducing the number of mechanical and electrical parts in a display device which requires a minimum of external circuitry for drive electronics.

Another object of the present invention is to provide an electromechanical display unit having an inherent memory, whereby a momentary loss of power does not erase the last-displayed character to the operator.

Another object of the invention is to minimize the duplication of internal circuitry and necessary drive circuitry for a fast display device capable of monitoring computer input and output information.

These and other objects are accomplished in accordance with features of the invention by a display device utilizing a plurality of display tapes with display and non-contact location code symbols positioned thereon for more reliable display symbol selection and associated decoding apparatus uniquely related to and time shared by each display tape to provide highly efficient electrical-to-visual conversion and a radically decreased display failure rate. The non-contact location codes are fixedly related to the display symbols to eliminate the necessity of including code discs and/or mechanical contacts to detect the display symbol being exhibited. The decoding technique allows any number of machine codes to be converted to visual symbols by merely rearranging the location code markings on the tape to be compatible with the machine code. Because of the unique relationship between the display device and the machine with which it is associated, only a minimum amount of drive circuitry need be incorporated in the machine, and a loss of display information during a machine power failure is precluded.

In one embodiment of the invention, the display unit includes a selected number of viewing windows in the front. A continuous display tape is associated with each viewing window, and on the display tape are positioned the symbols chosen to exhibit the information of the machine with which the display device is associated. Distinct location code symbols corresponding to each display symbol are also perforated in the tape, each location code symbol being divided between two fixed locations predetermined distances from the corresponding display code symbol.

For purposes of description, it will be assumed hereinafter that the display device of this invention and the machine with which it is associated are to operate with, upon, and in response to signals representing binary numbers, although it will be clear from both the general and detailed description that the fundamental concepts of the invention are equally applicable to convert signals representing numbers of number systems having bases other than two, such as a ternary system. It will also be assumed that the machine with which the display device of the invention is associated operates serially, i.e., the individual bits comprising a datum word appear one after another in time sequence. Accordingly, only one display tape is selected at a time.

Within the described embodiment of the present invention, translation of information (stored in a machine register) to display symbols is accomplished by energizing a drive motor in the display device only when the machine applies a select command signal to the motor. In response to the select signal, the motor drives a shaft common to all display positions. The select signal also releases a hold solenoid which allows one sprocket at a time to turn with the shaft and rotate its associated display tape. As the display tape rotates, the location code symbols are sensed by decoding apparatus within the display device without touching the display tape. When the selected display symbol is being exhibited through the corresponding viewing window, its location code signal is transmitted by the decoding apparatus to a logic network within the machine. A parity comparison is made in the logic network between the location code signal and the machine information signal stored in the register. A parity condition results in the removal of the select signal from the hold solenoid associated with the display symbol. With the select signal removed, the tape is fixed in position with the selected symbol exhibited in the viewing window.

These and other advantages and features which are believed to be characteristic of the present invention, both as to its organization and method of operation, will be better understood from the following description considered in connection with the accompanying drawings in which one embodiment of the present invention is illustrated by way of example. It is to be expressly understood, however, that the drawings are for the purpose of illustration and description only and are not intended as a definition of the limits of the invention.

Figure 1:
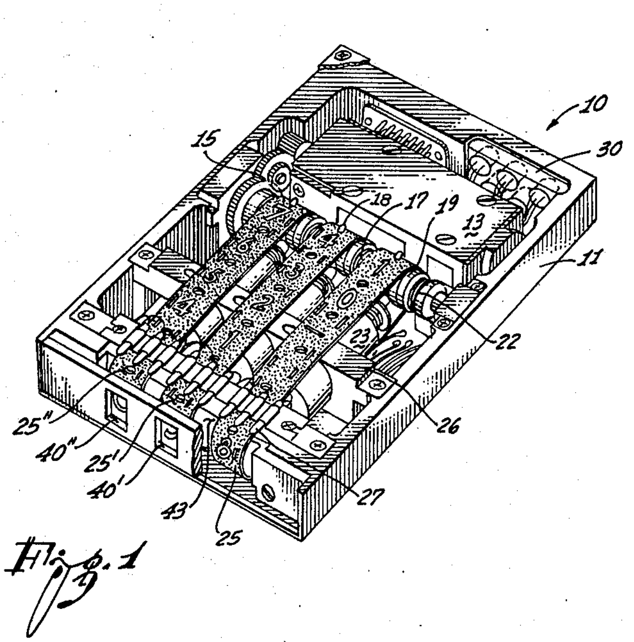
FIGURE 1 is a perspective view of a three digit-position display device constructed according to teachings of the present invention, wherein the display device is shown with its top cover removed and its front face plate partially cut away to better illustrate portions of the invention normally hidden thereby.
Figure 3:
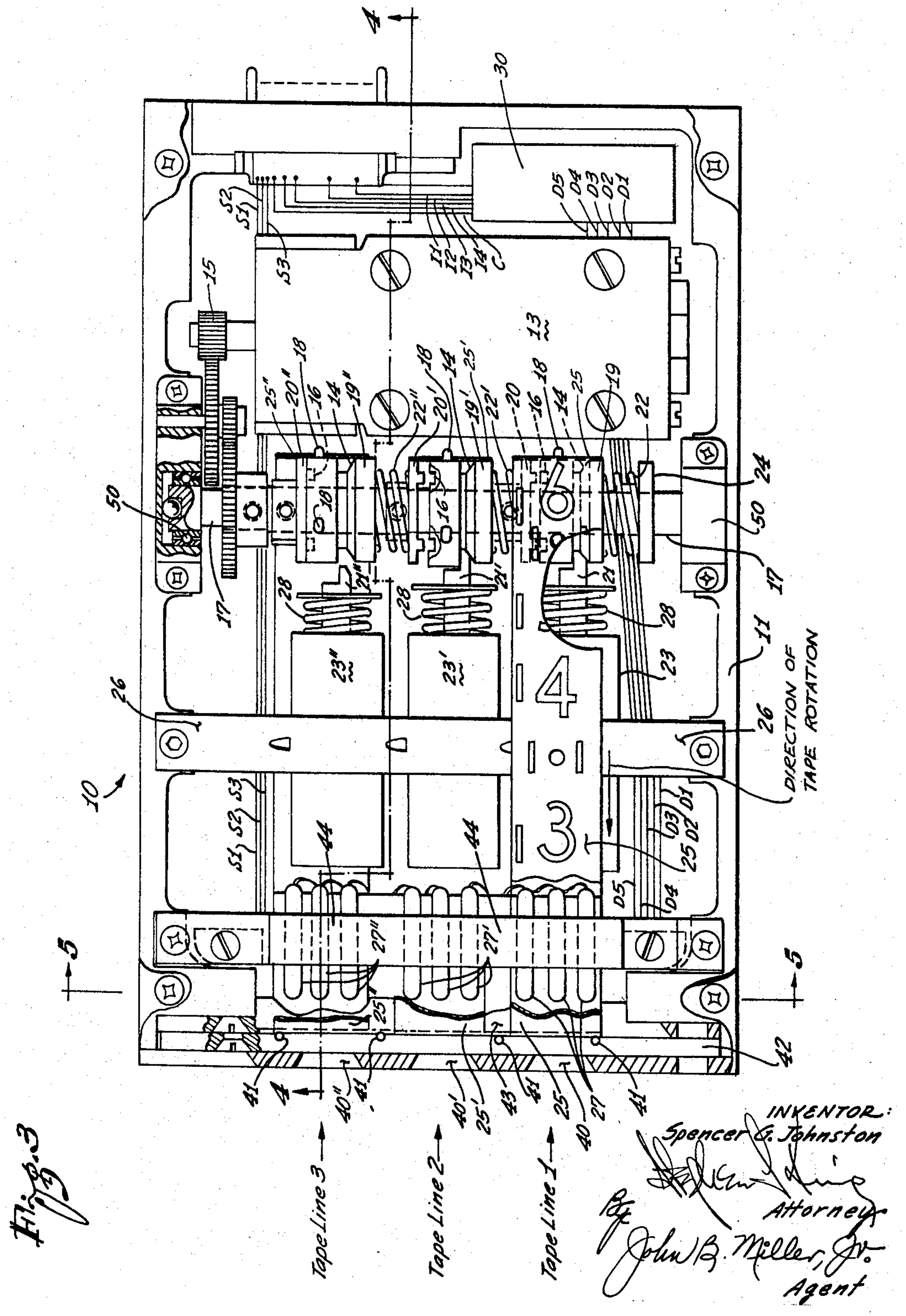
FIGURE 3 is a top plan view of the display device illustrated in FIGURE 1.

Attention is now directed to the drawings and, more particularly, to FIGURES 1 and 3 thereof, wherein corresponding parts of the invention will be designated by corresponding reference numerals. There is shown in FIGURE 1 a perspective view of a display device 10 comprising a case 11 housing three display tapes 25, 25′ and 25″. The display tapes are exhibited through three corresponding windows 40, 40′ and 40″, respectively, in the front of the case 11. Additionally, each tape 25 is continuous and passes over a tape mandrel 43 located directly behind the windows 40 and is advanced by a plurality of sprocket teeth 18 on a sprocket 19. The sprockets 19 are rotatable by a shaft 17 coupled by a gear train 15 to a motor 13. In response to an applied locking signal, a hold solenoid 23 releases one sprocket 19 and enables a spring 22 to urge the released sprocket 19 into engagement with a drive dog 20 which is rigidly attached to the shaft 17. The locking signal also activates the motor 13 which causes (through the gear train 15) the shaft 17 to rotate. Upon rotation of the shaft 17, the tape 25 associated with the released sprocket 19 revolves until a selected location code on the tape 25 is detected by a decoding apparatus 27 which generates a corresponding signal. When the desired location code signal is transmitted by the decoding apparatus 27 to the machine with which the display device 10 is operating, the locking signal is removed by the machine and the hold solenoid 23 again disengages the sprocket 19 from the drive dog 20.

The display device 10 of the invention may be used, for example, to monitor computer input and output information, machine tool rates, measurements, distances, or most any data from a machine having a definable electrical machine language. To facilitate a more detailed description of the structure and operation of the present invention, the electrical machine with which the described display device 10 of the invention is associated hereinafter will be assumed to be a digital computer. The display symbols on each tape 25 are assumed to be decimal digits. A natural-binary-coded-decimal (NBCD) code is used as the location code on the display tapes 25 and is assumed to be the machine language of the computer. With such a NBCD code, a unique bit-set of binary numbers is assigned to each decimal digit to be exhibited. Additionally, assuming that it is also desired to display a lack of a decimal digit (BLANK) and a DASH symbol, unique bit-sets are also provided for BLANK and DASH symbols. For example, a decimal digit "9" is represented by the bit-set "1001" in NBCD code, while a BLANK and DASH symbol are represented by the bit-sets "1110" and "1111," respectively, as shown in Table I below.

Figure 2:
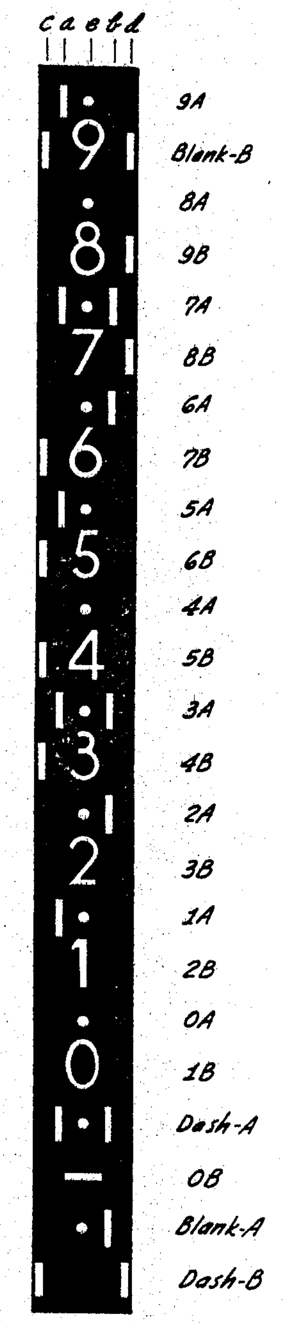
FIGURE 2 illustrates a display tape that is employed in the embodiment of the display device illustrated in FIGURE 1.

Referring to FIGURE 2, the display tape 25 is shown having positioned thereon the decimal display symbols "0" through "9," inclusive, a BLANK space, and a DASH symbol. Each display tape 25 may be fabricated of a fiber glass material known as Gentape, a tradename of the General Plastics Corporation of Paterson, N.J. The display symbols are painted on the clear fiber glass material of the display tape, the remaining surface of the tape may then be made opaque by coating it with a black paint. In addition to the decimal symbols, the tape is provided with rows of perforated holes, the holes being specially grouped in location code bit-sets, each bit-set corresponding to a display symbol and being positioned at fixed distance therefrom.

As stated hereinabove, a NBCD location code is used to represent the display characters. A binary digit (1 or 0) of the location code signal is represented by the presence or absence of a perforated hole in the display tape. The lines of perforated holes are labeled in FIGURE 2 in their order of greater significance, beginning with track "*a*" through track "*d*." The circular holes in track "*e*" serve two purposes: they are used by the tape sprocket 19 to advance the tape and by the decode apparatus 27 to generate a clock signal.

The positioning of the NBCD bit-sets on the display tape 25 may best be illustrated by drawing attention to one decimal character on the tape 25 and its corresponding location code bit-set, in particular the decimal character "7." As shown in Table I below, the character "7" is represented by the bit-set or natural binary number 0111 and a clock-bit, 1. The bit set is divided between two locations, the locations being the first bit position above and the second bit position below the character "7." These two locations will be referred to hereafter for each decimal character as positions A and B, respectively. The bits of the binary number representing the character "7" are found in tracks "*a*" and "*b*" of position A and in tracks "*c*" and "*d*" of position B. The clock-bit for character "7" is found in track "*e*" at position A. The reason for dividing the bit-set in this manner is so that an easily constructed non-contact decoding apparatus may be employed to read the location codes, as will be more clearly recognized from the description of the decoding apparatus which follows.

Each of the decimal display characters has its location code bit-set divided between two locations on the tape 25 similar to the manner described above. The two locations for each bit-set on the tape 25 are indicated to the right of the tape 25 in FIGURE 2 adjacent to each bit position. The display symbols and their corresponding NBCD location codes are shown in the following table:

TABLE I

| Tracks | Code | | | | Clock |
|---|---|---|---|---|---|
| | "d" | "c" | "b" | "a" | Track "e" |
| Display Symbol: | | | | | |
| 0 | 0 | 0 | 0 | 0 | 1 |
| 1 | 0 | 0 | 0 | 1 | 1 |
| 2 | 0 | 0 | 1 | 0 | 1 |
| 3 | 0 | 0 | 1 | 1 | 1 |
| 4 | 0 | 1 | 0 | 0 | 1 |
| 5 | 0 | 1 | 0 | 1 | 1 |
| 6 | 0 | 1 | 1 | 0 | 1 |
| 7 | 0 | 1 | 1 | 1 | 1 |
| 8 | 1 | 0 | 0 | 0 | 1 |
| 9 | 1 | 0 | 0 | 1 | 1 |
| BLANK | 1 | 1 | 1 | 0 | 1 |
| DASH | 1 | 1 | 1 | 1 | 1 |

Referring now with particularity to FIGURE 3 wherein the top view of the display device 10 is illustrated, the three display tapes 25, 25′ and 25″ that are driven by the shaft 17 may be seen. Each of the three display tapes and its corresponding hardware is called a "tape line." The cooperative relationship between each display tape and its corresponding hardware is identical for each tape line. For this reason, the structure and functions of these parts will be described with reference to FIGURES 3, 4, and 5 calling attention to a single one of the tape lines when illustrating specific features of the invention.

Continuing, then, it may be seen that the shaft 17 is rotatably mounted in the case 11 by a set of bearings 50. In tape line 2, the drive dog 20′ is firmly attached to the shaft 17. Adjacent to the drive dog 20′, the corresponding tape sprocket 19′ is slidably mounted on the shaft 17. One surface of the sprocket 19′ is constructed to have a plurality of lock grooves 16 into which the drive dog 20′ may position itself for turning the sprocket 19′. On the cylindrical surface of the sprocket 19′ are positioned three sprocket teeth 19, spaced 120° apart.

The solenoid 23′ is mounted in front of the sprocket 19′ by a yoke 26 which is secured to the sides of the case 11. An arm 21′ of the solenoid 23′ normally holds the sprocket 19′ away from its corresponding drive dog 20′. The arm 21′ is normally biased outward from the solenoid 23′ by a spring 28, which forces the arm 21′ against a canted surface 14 of the sprocket 19′ thereby holding the sprocket away from its corresponding drive dog 20′.

It will be noticed in FIGURE 3 that the sprocket in tape line 1 is disengaged from its drive dog 20; the sprocket 19′ in tape line 2 is disengaged from its drive dog 20′; and the sprocket 19″ of tape line 3 is engaged with its corresponding drive dog 20″. The sprocket 19″ is engaged with its drive dog 20″ because a locking signal was applied to the solenoid 23″ which, in response to the locking signal, pulled the control arm 21″ into the solenoid 23″ and allowed the coil spring 22″ to slide the sprocket 19″ along the shaft 17 until it mated with the drive dog 20″. As stated above, when the tape sprocket 19″ is engaged with its drive dog 20″, the display tape 25″ (through which the sprocket teeth 18 protrude) is rotated by the sprocket 19″ until the control arm 21″ again disengages the sprocket 19″ from the drive dog 20″.

Figure 4:
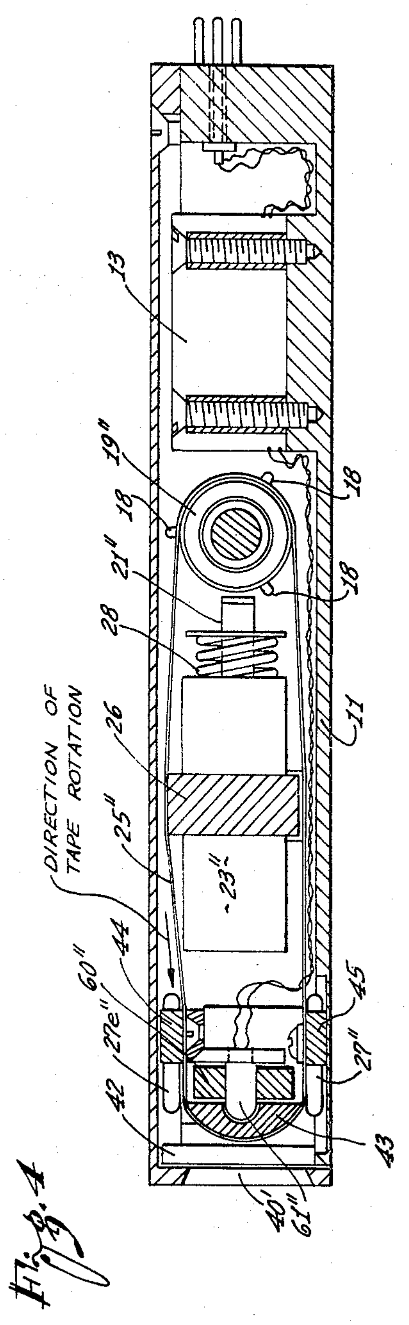
FIGURE 4 is a side cross-sectional view of the display device illustrated in FIGURE 3.

As further shown in FIGURES 3 and 4, each display tape 25 is continuous and passes around the tape sprocket 19, over and under the yoke 26 and the solenoid 23, and around the tape mandrel 43 at the front of the display unit 10. As the decimal display characters on the tape 25 pass around the tape mandrel 43, they are exhibited through the window 40 in the front of the display unit 10. Directly in front of the tape mandrel 43 (which may be made of a transparent material such as plastic) and to either side and behind the viewing windows 40, four panel lights 41 are mounted in a transparent face plate 42. The panel lights 41 in the embodiment described may be the type ML 202 manufactured by Sylvania Electric Products Inc. of Buffalo, N.Y. The panel lights 41 illuminate the decimal display characters on the tapes 25 when they are exhibited through the windows 40 in a dark environment. Besides these panel lights, as may be seen in FIGURES 4 and 5, lights associated with the decoding apparatus 27 may also shine light through the decimal characters on the tape.

In FIGURES 3 and 4, the direction of rotation of the tapes 25 is indicated by an arrow. It may be seen that, before the tapes 25 pass over the mandrel 43 and as the tapes 25 move away from the mandrel 43 towards the sprocket 19, each tape passes under a mounting bar 44 and over a mounting bar 45 which hold the decoding apparatus 27. The location codes are read above and below the tape mandrel 43 (as indicated above, ahead and following the display characters) as the tape 25 rotates. Specifically, the decoding apparatus comprises photocells 27 which generate decode signals D1, D2, D3, D4 and D5 that are transferred from the decoding apparatus to an electronics package 30 mounted in the rear of the case 11.

More particularly, in FIGURE 4 there is shown a first cross section of the display device 10 where the tape 25″ is shown passing under the mounting bar 44, around the tape mandrel 43 and over the mounting bar 45. Additionally, the display tape 25″ is shown passing over a light guide 60″ in the center of which is mounted an electrical bulb 61″. The light guide 60″ is designed to direct light rays from the bulb 61″ towards the locations on the display tape 25″ where the location codes are perforated. Light thus directed and which shines through the perforated holes in the display tape 25″ is detected by the photocells 27″ which respond by generating the decode signals.

Figure 5:
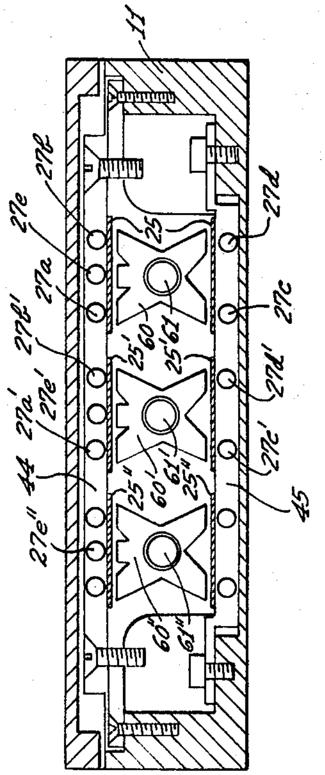
FIGURE 5 is a cross-sectional view of the display device illustrated in FIGURE 3 taken along a line 5—5 shown in FIGURE 3.

Referring now to FIGURE 5 there is shown a second cross section of the location code sensing apparatus. The pair of photocell mounting bars 44 and 45 are positioned above and below, respectively, the tape mandrel 43 (not shown in FIGURE 5). The photocell mounting bar 44 holds in place three photocells 27 per tape line that read the two least significant bit tracks *"a"* and *"b"* and the clock track *"e"* on the display tape 25. The mounting bar 45 secures in position two photocells 27 per tape line for reading the two most significant bit tracks *"c"* and *"d"* on the tape 25. More particularly, the display tape 25 passes between the mounting bar 44 and the light guide 60. The light guide 60, as shown in FIGURE 5, is constructed to have five legs, each extending from a centrally-located cavity in the guide 60 wherein the bulb 61 is mounted. Each light guide 60 may thereby direct light rays toward the location on the display tape where the respective photocells are to read.

It may be seen that in FIGURE 5 the photocells 27 are labeled according to the track on the display tape which they read. For example, the photocell 27*a* reads (senses light shining through perforated holes) track *"a"* on the display tape 25. The light which the photocell 27*a* senses is directed to it by one leg of the light guide 60. Similarly, the photocells 27*b*, 27*c*, 27*d* and 27*e* read tracks *"b," "c," "d,"* and *"e,"* respectively, on the display tape 25. If there is a slot punched in a tape track, light from the bulb 61, directed by a leg of the light guide 60 to the reading location, will pass through the display tape 25 and be detected by an adjacent corresponding photocell 27. How the light which shines through the slots in the display tape 25 affects the operation of the display device 10 will be described more fully below in connection with the description of FIGURE 6.

Virtually all of the operations of the display device 10 have now been described with varying particularity. All of the above-described operations of the display device 10 will now be reviewed in detail during the description of both the circuit of the display device and the electrical circuits and apparatus utilized in the digital computer associated with a preferred embodiment of this display device to mechanize these operations.

Figure 6:
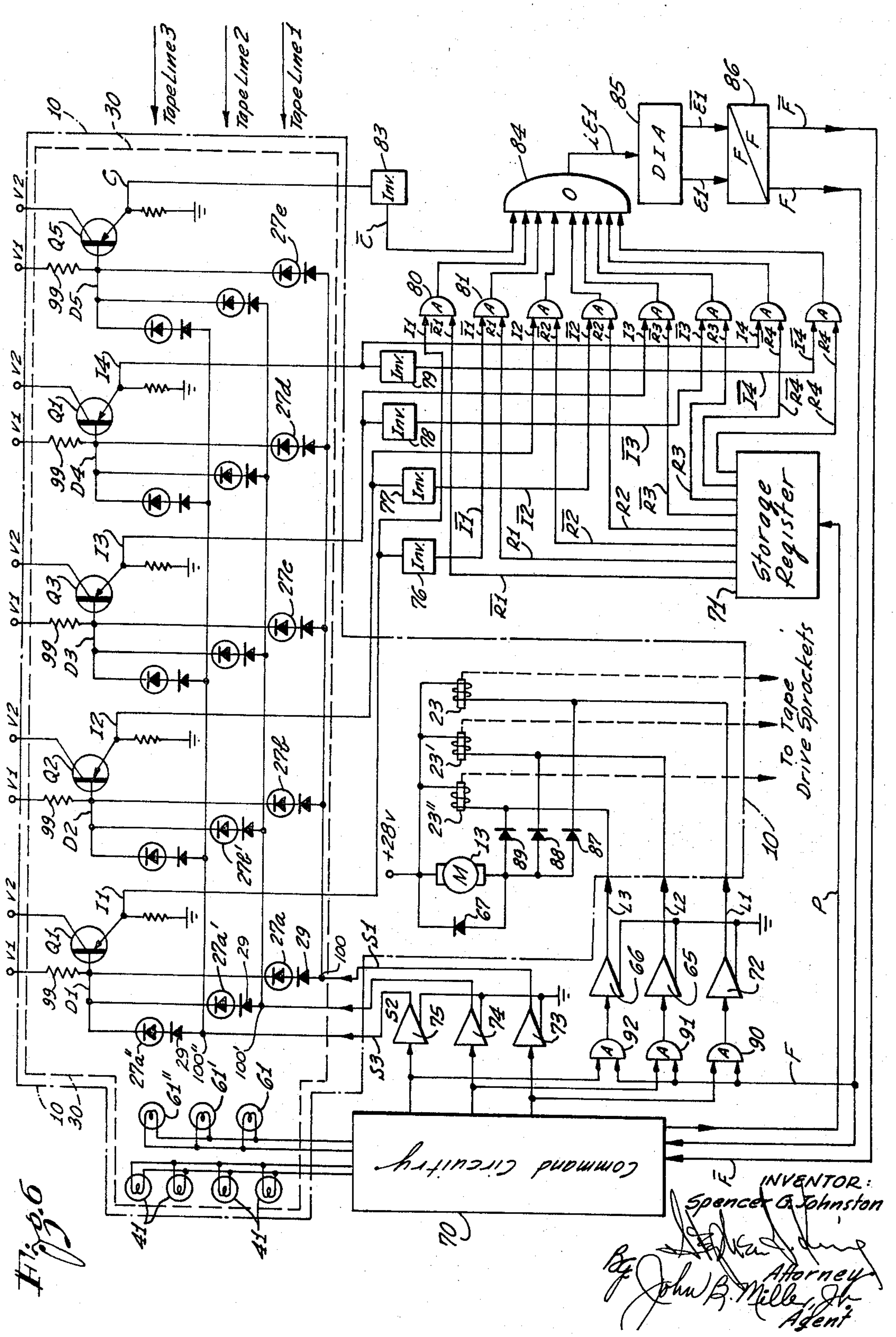
FIGURE 6 is a diagram illustrating the interconnection of tape decode circuitry and tape drive components and the interrelation of the display device and control electronics that may be employed in the machine associated with the present invention.

Attention is now directed to FIGURE 6 where there is shown a circuit diagram of the display device 10 of the invention. Associated with the circuitry of the display device 10 there is shown computer circuitry, in block diagram form, that may be used to operate the display device. Together with the description of the circuit of the display device 10, its operation will be described with reference to parts illustrated in FIGURES 1 through 5, inclusive.

Since a component-by-component representation of the computer circuitry with which the display device 10 is associated is extremely difficult, wasteful of descriptive space, and not strictly relevant to the structure of the present invention, algebraic representations of computer construction have been developed. The most widely used representation, a Boolean algebra representation, describes computer signals and computer elements by algebraic symbols. The two are then related by equations which represent computer construction and operation in terms of algebraic functions.

For example, numbers and instructions are represented in the physical electronic digital computer circuitry by discrete electrical signals. Normally, two state (binary) signals are chosen as the most reliable and as causing the least waste of equipment. Two levels (often voltage levels) of electrical signals are chosen to represent the two binary digits; for example, a first voltage may represent a binary "1," a second voltage, a binary "0." By combining the signals into groups in accordance with a prescribed pattern such as the NBCD binary number pattern described above, each number and instruction may be represented. These groups of signals may then be related by logical equations which define the interrelation of elements and signals.

In operation, the numbers and instructions appear as time sequences of voltages. A basic time interval (the clock interval) is selected. The boundaries of the clock interval are delineated by clock pulse signals generated from track *"e"* of the display tape 25.

In the present Boolean algebraic notation, the individual signals of the digital computer circuitry with which the display device 10 is associated are represented by alphanumeric symbols. To clarify the nomenclature utilized in the present description of FIGURE 6, consider the signals R1 and $\overline{R1}$ shown emanating from the storage register 71. The signals R1 and $\overline{R1}$ are produced by a flip-flop at the two output terminals thereof. The signals represent a set or "1" condition output and a reset or "0" condition output, respectively. Corresponding nomenclature and operation will be understood to apply to each of the other storage register 71 output signals and the identification signals generated by the display device 10. The output of the storage register 71 is taken directly at the output terminals of four flip-flops.

A gating network is provided in the digital computer circuitry illustrated in block form in FIGURE 6 which receives signals from the storage register 71 and from the display device 10. The gating network will ordinarily include a plurality of logical "AND" gates and "OR" gates arranged to combine the applied signals in accordance with an associated Boolean logical equation to produce a desired error output signal *i*E1. As is well known in the art and has been explained above, the Boolean equations associated with a gating network fully define the output signals produced by the network in terms of the input signals received by the network and, in addition, supply a complete description of the structure of the gating network.

In going through the simplified equation which follows, one should note that each of the component signals represents a diode input from the particularly designated component in the conducting condition, the conducting condition meaning that the particular condition is present. Each term of the equation represents a diode "AND" gate receiving inputs from the particular associated components. Each group of terms in the equation separated by (+) signs represents the diode "OR" gate receiving inputs from the diode "AND" gates of each particular term of the equation. A bar ($\overline{\ \ }$) sign over a particular term signifies that the opposite of the true or "1" condition obtains for that component or term, that is, false or "0" condition for that term. Thus, one embodiment of the gating network of the computer system with which the display device 10 is associated may be mechanized by substituting for the particular components and terms of the logical Equation 1 below the diode gating arrangements thereby defined and the inverting amplifiers, flip-flops, and so on, for furnishing the signals for those terms.

Accordingly, the gating network may be represented by the following Boolean logic equation:

$$\begin{aligned} iE1 = {} & I1\overline{R1} + \overline{I1}R1 \\ & + I2\overline{R2} + \overline{I2}R2 \\ & + I3\overline{R3} + \overline{I3}R3 \\ & + I4\overline{R4} + \overline{I4}R4 \\ & + \overline{C} \end{aligned}$$

Before considering the manner in which the various terms in the foregoing equation are produced, the manner in which these terms specify in detail the mechanization of the logical gating matrix illustrated in FIGURE 6 will be investigated. For purposes of simplicity and clarity, the mechanization of the logical gating network which supplies the input signals to a flip-flop 86 will be described with particularity with reference to Equation 1. Once the gating techniques are thoroughly understood, the mechanization of the remaining terms of the logical equation will be readily apparent to those skilled in the art. As will be apparent, the gating network of the computer circuitry shown in FIGURE 6 in block diagram form is mechanized in strict accordance with the logical Equation 1 above.

FIGURE 6 shows the logical gating network which comprises input functions from the display device 10 and the storage register 71. The network comprises a plurality of logical "AND" gates and an "OR" gate, each logical "AND" gate being represented by a closed semicircle with an A (A) in its center and the logical "OR" gate being represented by a closed semicircle with a *"o"* (*o*) in its center. There are known to those skilled in the art any number of methods of mechanizing such gates. However, in the disclosed embodiment, conventional diode gating circuits are preferred and shown.

Briefly stated, an "AND" gate includes two or more input terminals and a single output signal. Such a gate is responsive to the voltage levels of the two-level signals applied to its input terminals for producing a one-level output signal at its output terminal only when all of the input signals are of their "1"-level values. The "OR" gate, on the other hand, includes two or more input terminals and is responsive to voltage level signals applied to its input terminals for producing a one-level output signal at its output terminal whenever one or more of the input signals is at its "1"-level value. In FIGURE 6, a negative signal is considered a "1"-valued signal; a ground-level signal, a "0" valued signal. Similar discussions of the manner in which Boolean logical equations may be mechanized by corresponding gating networks have appeared in a variety of prior art publications, as for example in an article entitled, "An Algebraic Theory for Use in Digital Computer Design," by E. C. Nelson, Transactions of the I.R.E. Professional Group on Electronic Computers, September 1954, pages 12 through 21.

From Equation 1 it will be recognized by those skilled in the art that when there is a lack of identity between any of a plurality of register signals (R) and a plurality of identification signals (I) produced by the display device 10, the "OR" gate 84 will apply an error signal *i*E1 to a dual inverting amplifier 85. A lack of identity obtains when both terms of a group of terms in Equation 1 have "1"-level values, or the $\overline{C}$ term has a "1"-level value indicating that no clock signal is being produced.

Referring now to the circuit diagram of the display device 10, illustrated in FIGURE 6, the decoding apparatus in each tape line employs five photocells 27*a*, 27*b*, 27*c*, 27*d*, and 27*e* to produce the identification signals. Each of the photocells 27 is connected in series with an isolation diode 29 from a select signal input terminal 100 to the base electrode of a transistor. The isolation diodes 29 prevent the flow of current from a bias source V1 through a resistor 99, the photocell 27, and one of the respective drive amplifiers 73, 74 or 75 to ground, when a select signal has been applied and yet the photocell 27 has not detected any light. The photocells 27*a*, 27*a'* and 27*a''*, for example, for reading the least significant bit tracks on each display tape, are connected through isolation diodes 29 from the input terminals 100, 100' and 100'', respectively, to the base electrode of a transistor Q1. The photocells for reading the more significant bit tracks on each display tape are similarly connected with corresponding isolation diodes to a plurality of transistors Q2, Q3, and Q4, respectively. The photocells 27*e* for reading the clock bit track on each display tape are similarly connected with corresponding isolation diodes to the base electrode of a transistor Q5.

The transistors Q1 through Q5 comprise the active elements of five photocell amplifiers contained in the electronics package 30 mounted in the rear of the case 11 illustrated in FIGURES 1 and 3. The base electrodes of the transistors Q1 through Q5 are appropriately biased by connecting each of the base electrodes through a resistor 99 to the voltage source V1. The collector electrode of each of the transistors Q1 through Q5 is biased at a potential V2.

As stated above, the location codes on the display tapes 25 in tape line 1 are read by the photocells 27*a* through 27*e*. Where light shines through a bit slot in the display tape 25 and falls upon the photocell 27, the photocell responds by generating a predetermined "1"-level decode signal; whereas, when no light shines through a slot, the photocell 27 responds by producing a low or "0"-level decode signal. The decode signals D1, D2, D3, D4 and D5 generated by the photocells 27*a* through 27*e*, respectively, are applied to the transistors Q1, Q2, Q3, Q4 and Q5, respectively. The transistors Q1 through Q5 produce a plurality of identification signals I1, I2, I3, I4 and C, respectively, corresponding to and substantially following their respective decode signals. It will be recalled that the identification signal C is the clock signal which delineates the boundaries of the clock interval and is produced in response to the plurality of circular holes in the clock track "*e*" on the display tape 25. Also, the clock identification signal C is only produced when a symbol of the display code is centered in a viewing window 40.

Attention is now directed to the circuit diagram of the tape drive mechanisms in each tape line including the motor 13 and a solenoid 23. Each solenoid 23 as shown in FIGURE 6 is connected between a 28 volt source and a corresponding one of a plurality of drive amplifiers 72, 65, or 66. One terminal of the motor 13 is also connected to the 28 volt source. It should be noted that one of a plurality of diodes 87, 88, and 89 is respectively connected between the common connection of each solenoid 23 and its drive amplifier and the second terminal of the motor 13 for the purpose of isolating the solenoids 23 from one another. More particularly, when a locking signal is applied to one solenoid 23 so that its tape sprocket 19 will rotate, it is desirable to have the motor 13 energized at the same time by the applied locking signal. But it is also required that the other tape sprockets be held sationary by the remaining solenoids. Accordingly, the diodes 87, 88, and 89 prevent one particular locking signal from actuating more than the one solenoid to which it is applied. Moreover, a diode 67 is shown connected across the terminals of the motor 13 to protect the amplifiers 65, 66, and 72 against inductive surges from the motor 13 when the locking signals are alternately applied and removed from the motor 13.

In one specific illustrative embodiment of the invention, the foregoing active circuit elements employed in the display device 10 of the invention may take the following illustrative values:

TABLE II

| | |
|---|---|
| Q1, Q2, Q3, Q4, Q5 | Transistor 2N706. |
| Diodes 29, 67, 87, 88, 89 | Diode 1N3206. |
| Photocells 27 | Photodiode EA7, Hoffman Electronics, El Monte, Calif. |
| Motor 13 | Type 98A102, Globe Industries, Inc., Dayton, Ohio. |
| Solenoids 23 | Model 05SD887, PSP Engineering Co., Maywood, Calif. |

Assuming that the computer operator desires to have the information stored in the computer storage register 71 exhibited by a display device 10 of the invention, the tape lamps 61, 61' and 61''' are energized by the command circuitry 70. The panel lights 41 are continually energized by the command circuitry 70 as long as the computer (of which the command circuitry 70 is a part) is operating. Since the computer is serial in character, the binary number representing the least significant light stored in the register 71 will be the first to be examined and considered for display.

The command circuitry 70, therefore, steps through a cyclic logical operation which is serial in character. The command circuitry 70 causes an amplifier 73 to apply a select signal S1 to each of the photocells 27*a*, 27*b*, 27*c*, 27*d*, and 27*e* which conductively biases each of the photocells. Simultaneously, the select signal S1 from the command circuitry 70 is applied to one input terminal of an "AND" gate 90. The command circuitry 70 also applies a command signal P to the storage register 71 to cause the register 71 to produce output signals R1, R2, R3, and R4 and their complements $\overline{R1}$, $\overline{R2}$, $\overline{R3}$, and $\overline{R4}$ representing the binary information stored in the register 71.

Unless the photocells 27, upon energization by the command circuitry 70, detect a location code on the tape 25 which corresponds to the binary numbers stored in the register 71, an error signal *i*E1 is applied by the "OR" gate 84 to the inverting amplifier 85 which causes a find signal F to be produced by the flip-flop 86 and also applied to the "AND" gate 90. The manner in which the find signal F is generated will be understood from the description which hereinafter follows. The find signal F is also applied to the command circuitry 70 to cause the command circuitry 70 to stop its cycling operation until a parity condition exists between the identification signals produced by the display device 10 and the register signals produced by the storage register 71.

The application of the select signal S1 to one input terminal of the "AND" gate 90 together with the application of the find signal F to the other "AND" gate 90 input terminal causes the "AND" gate 90 to pass a signal on to the amplifier 72. The locking signal L1 is produced by the amplifier 72 and is applied to the solenoid 23 and through the diode 87 to the motor 13. It will be recalled that the locking signal L1 is the signal which causes the solenoid 23 to pull the control arm 21 into the solenoid, thereby allowing the coil spring 22 to slide the sprocket 19 along the shaft 17 until it mates with its corresponding drive dog 20. Having thus actuated the motor 13 and the solenoid 23, tape 25 in tape line 1 rotates freely until the location code (represented by the perforated holes in the tape 25, as sensed by the photocells 27*a*, 27*b*, 27*c* and 27*d*) corresponds to the binary number stored in the register 71.

In order to affect a comparison between the identification signals and the register signals in accordance with Equation 1 to see if a parity condition exists, the identification signals I1 through I4 and the clock signal C are applied to a plurality of inverting amplifiers 76 through 79 and 83, respectively. The inverting amplifiers operate to produce a signal which has the opposite logical level from the signal which is applied. For example, if the identification signal I1 is applied at its true or "1"-level value, the inverting amplifier 76 to which the signal I1 is applied will produce the inverse signal $\overline{I1}$ at a false or "0"-level value.

Accordingly, the identification signals together with their complements are applied to the logical "AND" gates together with the register signals and their complements. The desired result is that the signal I1 through I4 be identical to the signals R1 through R4, respectively. The test for a parity condition is made in accordance with Equation (1) above in the "AND" gates to which the signal pairs are applied.

For example, to an "AND" gate 80 are applied the identification signal I1 (from the code detection amplifier Q1) together with the complement of the signal R1 from the storage register 71, the signal $\overline{R1}$. If both signal I1 and $\overline{R1}$ are applied to the "AND" gate 80 at their true or "1"-level valve, an output signal of the "AND" gate 80 is produced and applied to the "OR" gate 84. The significance of this event is that the character being exhibited by the tape 25 in tape line 1 does not correspond to the number in the storage register 71 to be displayed. The presence of an I1 signal and the lack of an R1 signal ($\overline{R1}$ in a true state) indicates this fact.

However, if no bit slot were read on tape 25 in tape line 1 by the photocell 27*a*, a false or "0"-level value identification signal I1 would be applied to the inverting amplifier 76. In response to this signal, therefore, the inverting amplifier 76 would produce a true or "1"-level value identification signal $\overline{I1}$ which would be applied to an "AND" gate 81 together with the register signal R1. Assuming the identification signal $\overline{I1}$ and the register signal R1 are at the true or "1"-level value when applied to the "AND" gate 81, the "AND" gate 81 will respond by producing a signal which is applied to the "OR" gate 84. Obviously, though, the identification signals I1 and $\overline{I1}$ cannot be at the "1"-level value at the same time. Similar comparisons of the identification signals I2, I3 and I4 with the register signals R2, R3 and R4, respectively, are accomplished by the remaining six "AND" gates.

From the above, it may be seen that when there is a lack of identity between any of the register signals and the identification signals, the "OR" gate 84 applies the error signal *i*E1 to the dual inverting amplifier 85 which receives the signal *i*E1, amplifies it and produces the signals E1 and $\overline{E1}$. When there is a lack of identity between any of the identification signals and the register signal, the signal E1 is at its true or "1"-level value and $\overline{E1}$ is false. However, when there is parity between the identification signals and the register signals, the opposite condition obtains.

The signal E1 sets the flip-flop 86, which in its set condition produces the find signal F indicating a lack of identity between the register and identification signals. The signal E1 resets the flip-flop 86, which flip-flop in its reset condition produces the no-error signal $\overline{F}$ indicating that a parity condition exists between the register and identification signals.

The tape continues to rotate when a find signal F is applied to the "AND" gates 90, 91 and 92 until a location code is read which produces identification signals equal to the signals produced by the storage register 71. Such a parity condition results in the error signal *i*E1 going to the false or "0"-level value, thereby causing the flip-flop 86 to be reset. With the flip-flop 86 in its reset condition, the flip-flop output signal $\overline{F}$ goes to its "1"-level value. The $\overline{F}$ signal is applied to the command circuitry 70 to indicate that the cycling operation may again begin, this time with reference to tape line 2 and tape line 3 in sequence for a comparison of the decimal character exhibited by each tape with the binary number stored in the register 71. When the locking signals are removed from the solenoids 23, 23′ and 23″, the respective tape sprockets 19, 19′ and 19″ are fixed in position with the display characters required to represent the information in register 71 exhibited through the view windows 40.

It is to be understood that the above-described arrangements are illustrative of the application of the principles of the invention. Numerous other mechanical and circuit arrangements may be devised by those skilled in the art without departing from the spirit and scope of the invention. Thus, by way of example and not of limitation, photo-transistors may be used in place of the above-described photo diodes for sensing the light which would shine through the holes in a digit tape. However, each display tape may be mechanized so as to have magnetic markings to designate the location codes. In such case, magnetic pickups may be used to detect the location codes from the tape. Nevertheless, the location code could be placed substantially as described above with respect to the characters on the tape.

The identification signals may also be used to trigger an audible display for presenting information to the auditory sense. For example, if the identification signals were not only applied to the comparator circuitry but were also applied to audio amplifiers, they might be used to trigger different sounds or words for different display characters. Accordingly, from the foregoing, it is evident that various changes may be made without departing from the spirit of the invention as defined in the appended claims.

What is claimed as new is:

1. A display system for exhibiting symbols that represent information in a first plurality of coded electrical signals of a machine, said display system comprising:

a housing having a window opening at one end;

a display tape having symbols of a preselected display code and indicia of a selected machine code affixed thereto, said display tape being supported to have the symbols of said display code successively moved past said window opening;

decoding means for non-contiguously sensing the indicia of said machine code and for generating a bilevel clock signal at a first and second level, said clock signal being at a first level when one symbol of said display code is centered in said window opening and for generating a first plurality of identification signals to indicate which symbol of said display code is exhibited;

logic means responsive to the application of the first plurality of coded electrical signals, said first plurality of identification signals and said clock signal for comparing said identification signals to the electrical signals, said logic means including circuit means for producing an actuating signal whenever said clock signal is at its second level or whenever a signal-for-signal parity condition does not exist between said plurality of identification signals and the plurality of electrical signals; and tape drive means responsive to said actuating signal for rotating said display tape until said plurality of identification signals have signal levels equal to the signal levels of the plurality of electrical signals.

2. A display system as defined in claim 1, wherein the indicia of said selected machine code comprise the presence or absence of a plurality of perforations in said display tape, and wherein said decoding means includes an electric bulb positioned on one side of said display tape and a corresponding plurality of photocells positioned on the opposite side of said display tape from said electric bulb for detecting perforations in said display tape by sensing light shining therethrough.

3. A display system as defined in claim 2, wherein said decoding means further includes a plurality of photocell amplifiers respectively connected to one of said plurality of photocells for producing said first plurality of identification signals and said clock signal.

4. A display system as defined in claim 3, wherein said first plurality of identification signals and the plurality of electrical signals have a first and a second level, an identification signal at its first level being produced by one of said plurality of photocell amplifiers when a corresponding one of said photocells senses light shining through one of said perforations in said display tape, said logic means further including circuit means for producing complementary signals of said identification signals and said clock signal, and gating means responsive to the application of the first plurality of coded electrical signals, said first plurality of identification signals, and the complementary signals of said identification signals and said clock signal for generating said actuating signal whenever said clock signal is at its second level or whenever corresponding ones of said identification signals and the coded electrical signals are not at identical levels.

5. A display system as defined in claim 4, wherein said tape drive means further includes means for rotating said display tape, an electric motor, a solenoid for coupling said motor to said means for rotating said tape, and second gating means responsive to the application of said actuating signal and a command signal from the machine for activating said motor and said solenoid to rotate said display tape.

6. A display device for exhibiting symbols that represent information in coded electrical signals of a machine, said display device comprising:

- a housing having a window opening at one end thereof;
- a tape mandrel mounted between the sides of said housing behind said window opening;
- a shaft rotatably mounted between the side of said housing a first distance from said tape mandrel;
- an electric motor mounted in the rear of said housing a second distance from said tape mandrel greater than said first distance, said motor having its axis of rotation oriented to be parallel to the longitudinal axis of said shaft;
- a gear train coupling said motor to said shaft;
- a drive dog rigidly attached to said shaft;
- a sprocket slidably positioned on said shaft and engageable with said dog, said sprocket having a plurality of teeth equally spaced circumaxially thereabout and having a circumferentially located canted surface;
- biasing means positioned about said shaft for normally holding said sprocket in engagement with said drive dog;
- a continuous display tape having a selected display code and a selected machine code affixed thereto, said machine code being the same as the code of the electrical signals and having a bit-set corresponding to each symbol of said display code, said display tape being supported to have the symbols of said display code successively moved past said window opening, said display tape being looped around said tape sprocket so as to engage with said sprocket teeth and passed around said tape mandrel;
- a solenoid including a plunger, said solenoid being mounted within the continuous loop of said display tape to have said plunger engagable with said canted surface of said sprocket for disengaging said sprocket from said drive dog;
- a plurality of panel lights positioned around the edges of said window opening for illuminating the symbols of said display code being exhibited through said window opening; and
- decoding means for non-contiguously sensing said bit-sets of said machine code and for generating identification signals indicative of the symbol of said display code being exhibited through said window opening.

7. A display device as defined in claim 6, wherein said bit-sets of said machine code comprise the presence or absence of a plurality of perforations in said display tape, each of said bit-sets being divided between two locations on said display tape, said two locations being at fixed distances from the corresponding display symbol, and said decoding means including an electric bulb positioned behind said tape mandrel, a light guide surrounding said electric bulb, said light guide having a first plurality of legs for directing light rays emitted by said bulb to said two locations on said display tape where perforated holes might appear, and a first plurality of photo-cells positioned on opposite sides of said tape from said light guide for sensing the presence or absence of perforated holes by detecting the presence or absence of light directed by said light guide which shines therethrough.

References Cited

UNITED STATES PATENTS

| | | | |
|---|---|---|---|
| 2,965,727 | 12/1960 | Passman | 340—324 |
| 3,046,542 | 7/1962 | Hager | 340—324 |
| 3,047,852 | 7/1962 | Smith | 340—324 |
| 3,222,666 | 12/1965 | Hallden | 340—324 |
| 3,199,097 | 8/1965 | Hartley | 340—324 |
| 3,266,019 | 8/1966 | Beckwith | 340—324 |
| 3,281,820 | 10/1966 | Snider | 340—324 |
| 3,323,121 | 5/1967 | Burton et al. | 340—324 |

JOHN W. CALDWELL, *Primary Examiner.*

NEIL C. READ, *Examiner.*

A. J. KASPER, *Assistant Examiner.*